(12) United States Patent
Ledesma et al.

(10) Patent No.: US 11,618,393 B1
(45) Date of Patent: Apr. 4, 2023

(54) MODULAR RAIL FOR WIRE HARNESS RETENTION

(71) Applicant: FORD GLOBAL TECHNOLOGIES, LLC, Dearborn, MI (US)

(72) Inventors: José Luis Ledesma, Toluca (MX); Mauricio Garcia Vicencio, Coyoacán (MX); Rodrigo Alejandro Cabrera Meléndez, CD. López Matéos (MX); Mauricio Garcia, Mexico City (MX); José Antonio Lopez Sanchez, Mexico City (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/829,703

(22) Filed: Jun. 1, 2022

(51) Int. Cl.
  *B60R 16/02* (2006.01)
  *H02G 3/32* (2006.01)

(52) U.S. Cl.
  CPC ...... *B60R 16/0215* (2013.01); *B60R 16/0207* (2013.01); *H02G 3/32* (2013.01)

(58) Field of Classification Search
  CPC ............ B60R 16/0207; B60R 16/0215; H01B 7/0045; H02G 3/30; H02G 3/32
  See application file for complete search history.

(56) References Cited

U.S. PATENT DOCUMENTS

| 7,497,718 B2 | 3/2009 | Nix et al. |
| 8,313,064 B2 | 11/2012 | Stocker |
| 2019/0334331 A1* | 10/2019 | Henry ................ H02G 3/0475 |
| 2021/0091553 A1* | 3/2021 | St-Cyr ................ H02G 11/00 |
| 2021/0273431 A1* | 9/2021 | Fukami ............... H02G 3/0406 |

FOREIGN PATENT DOCUMENTS

| JP | 1252921 B2 | 4/2009 |
| JP | 2015050872 A | 3/2015 |

* cited by examiner

Primary Examiner — Paresh Paghadal
(74) Attorney, Agent, or Firm — Frank L. Lollo; MacMillan, Sobanski & Todd, LLC

(57) ABSTRACT

A modular rail as a wire harness mounting system uses clips and tie straps. Each clip has a clip post engaging a mounting hole and a clip head. The modular rail has a plurality of rail segments sequentially joined by toolless interlocks disposed at each longitudinal end of each rail segment. Each rail segment has a plurality of eyelets at longitudinally-spaced locations for receiving respective tie-down straps adapted to encircle the wire harness. The interlocks have complementary clasp features including a latch tab that deflects to enable engagement of each respective interlock. A bottom surface of each rail segment has a plurality of longitudinally-spaced brackets, each having a slide track configured to secure a clip head along a range of locations on the slide track. A top surface of each rail segment receives the wire harness when the wire harness is secured via the tie-down straps being inserted through respective eyelets.

14 Claims, 6 Drawing Sheets

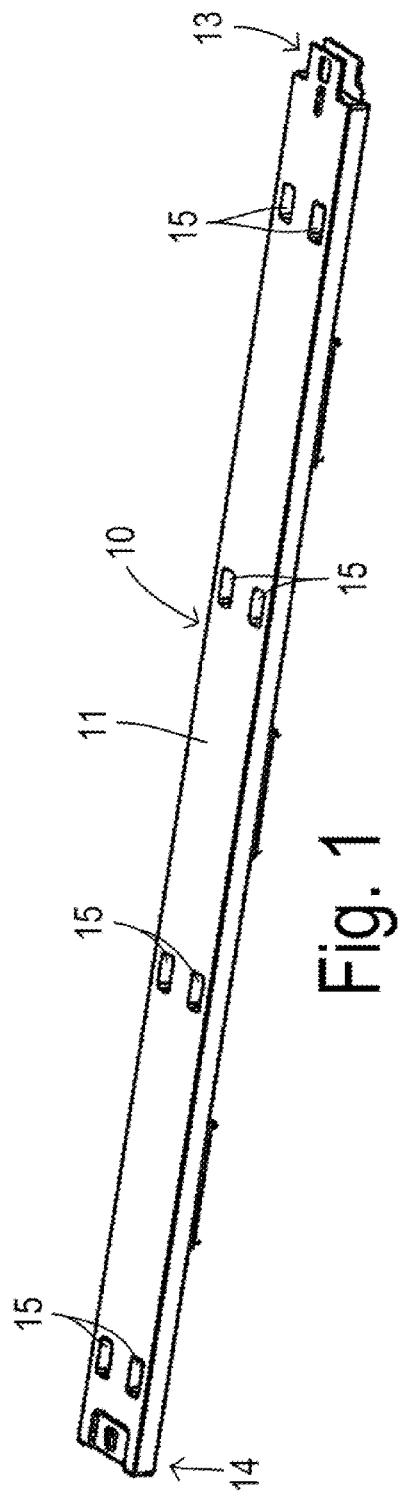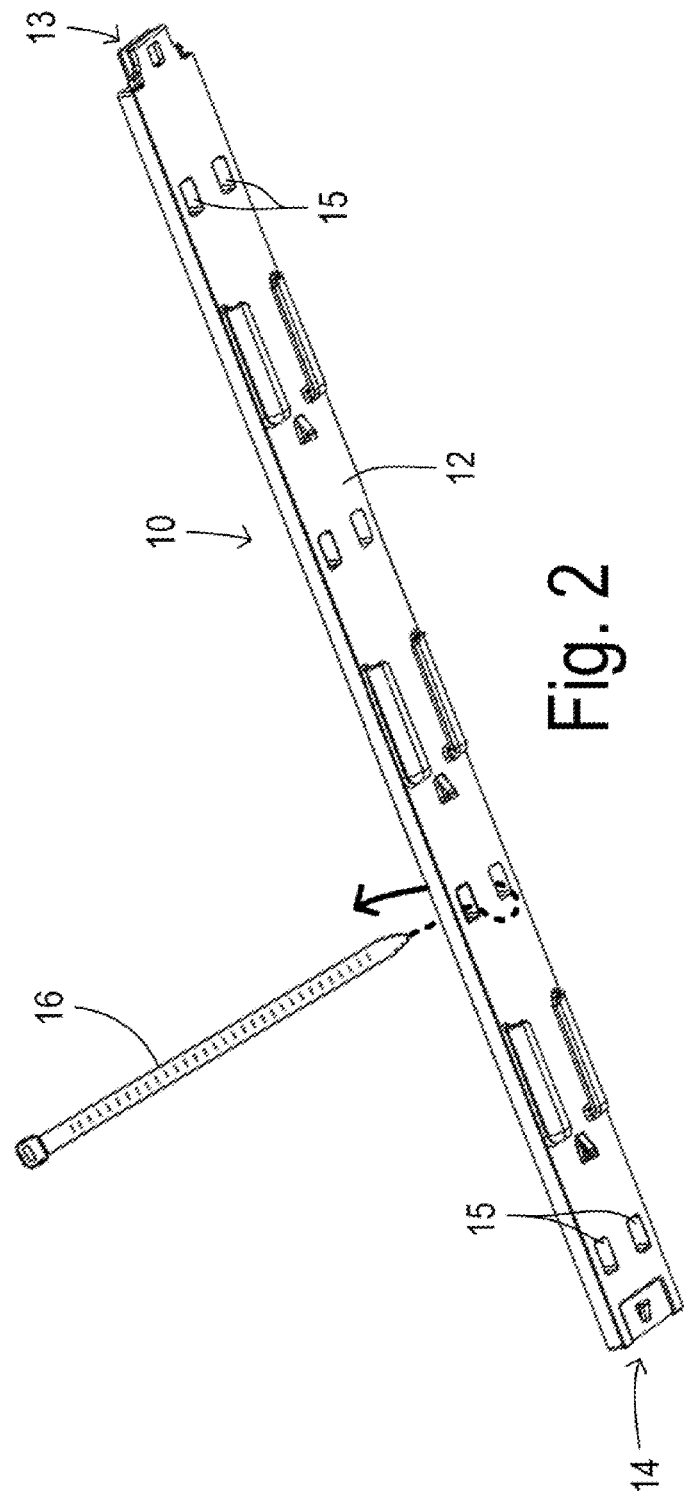

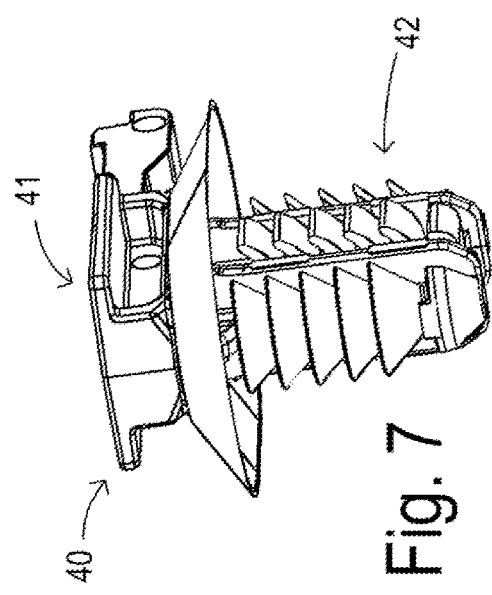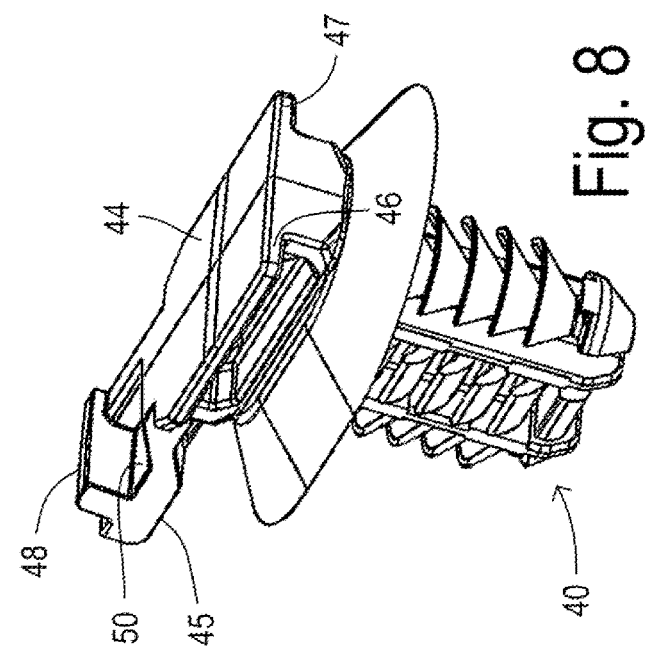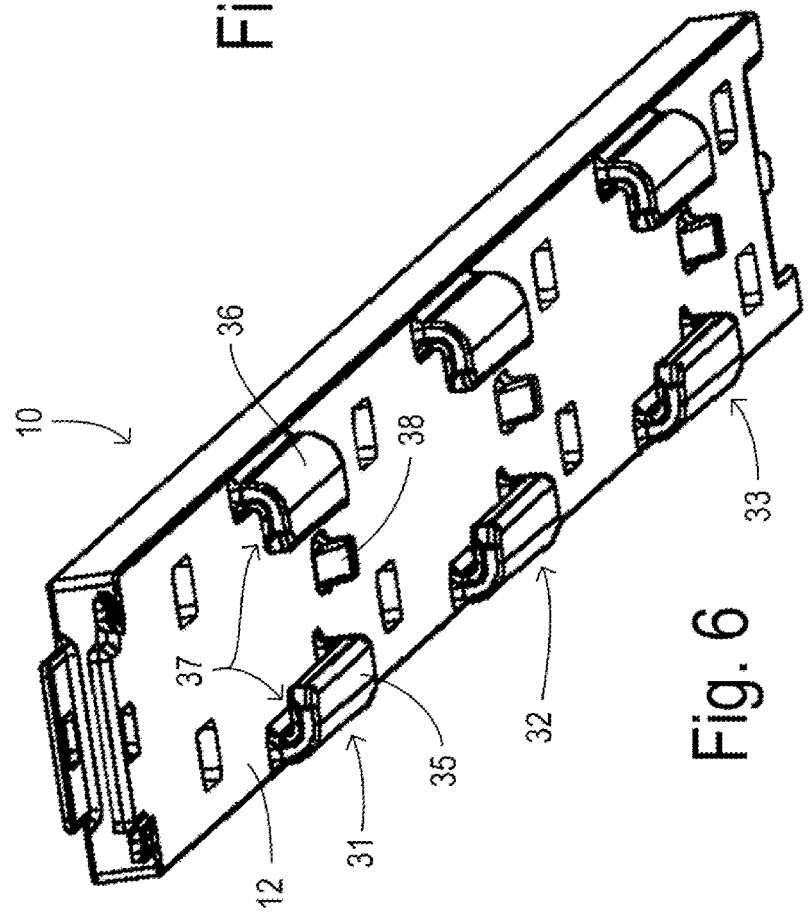

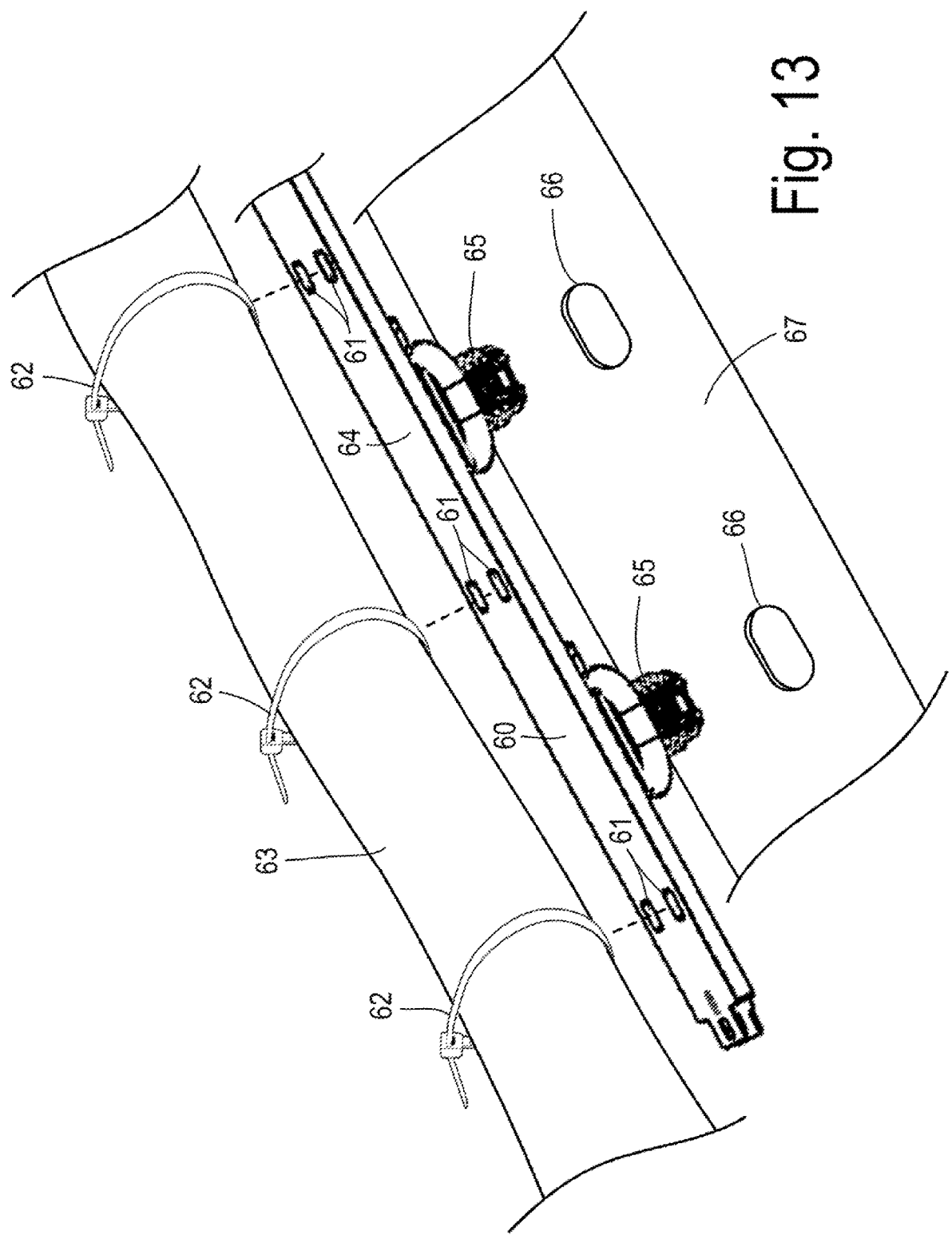

A MODULAR RAIL FOR WIRE HARNESS RETENTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to electrical wiring systems for motor vehicles, and, more specifically, to the mounting of cable/wire harnesses onto structural surfaces of a vehicle which route signals and electrical power among electrical/electronic components in the vehicle.

An automotive vehicle (i.e., a motor vehicle or road vehicle) utilizes many electronic components, modules, and systems. For proper operation, the electronic elements are connected to one another through one or more wiring harnesses to distribute electrical power and various signals (e.g., commands and data). To facilitate assembly and repair of the electronic modules in the vehicle, connectors are used to couple the wiring harnesses to the electronic components. Insulated cables (i.e., wires) are typically bound together in harnesses forming various routing segments using straps, cable ties, adhesive tape, and/or conduits.

When all the cable routing implemented by the wire harnesses is large, it is common to have one or more particular branches with extended uninterrupted length dimensions which may require several mounting retainers to independently support the branch along a supporting structural panel of the vehicle. A typical structural panel may be a stamped sheet metal panel of the vehicle body. Holes are typically stamped into the sheet metal panel to receive clips or other retainers that hold the wire harness branch.

In some instances, the wire harness branches may be mounted in molded plastic channels with extended tubes to carry the branch, wherein the channels have integral clips which are located to align with the sheet metal holes for mounting the channels. Due to tolerances of the clips and the sheet metal holes, however, it is common to have instances of misalignment between the clips and the holes so that it becomes difficult to install the channels. Moreover, uniquely designed plastic channels for a particular wire harness branch of a particular vehicle (e.g., based on bundle size, hole locations, and routing path of a branch) may typically result in long design/development times, high tooling investments, long tooling lead times, and high piece cost for the channels. Any such custom design for a channel may support use with only a specific wire bundle size and only for a specific use in a single vehicle model.

SUMMARY OF THE INVENTION

The invention provides a wire harness mounting system with a modular rail capable of multiple uses across a variety of vehicle designs. The modular architecture is adaptable depending on the length needed for supporting wire harness branches. As a result, the piece cost and the investment of finances and time associated with product development and tooling are reduced.

In one aspect of the invention, a wire harness mounting system is provided for mounting a wire harness within a road vehicle. The mounting system includes a plurality of clips, each clip having a clip head and a clip post, wherein the clip post is configured to engage a mounting hole in a surface of the vehicle. A modular rail is comprised of a plurality of rail segments which are sequentially joined together by respective toolless interlocks disposed at each longitudinal end of each rail segment. Each rail segment has a plurality of eyelets at longitudinally-spaced locations for receiving respective tie-down straps adapted to encircle the wire harness, and the interlocks are comprised of complementary clasp features including a latch tab that deflects to enable engagement of each respective interlock. A bottom surface of each rail segment has a plurality of longitudinally-spaced brackets, wherein each bracket comprises a slide track configured to secure a clip head along a range of locations on the slide track. A top surface of each rail segment is adapted to receive the wire harness when the wire harness is secured via the tie-down straps being inserted through respective eyelets.

BRIEF DESCRIPTION OF THE DRAWINGS

FIG. 1 is a top, perspective view of a rail segment.

FIG. 2 is a bottom, perspective view of a rail segment and tie-down strap.

FIG. 6 is another bottom, perspective view of a rail segment.

FIGS. 7-9 are perspective views of a clip for joining a modular rail to a vehicle sheet metal panel.

FIG. 13 is a partially exploded view showing a wire harness, tie-down straps, modular rail, clips, and vehicle sheet metal panel with clip mounting holes.

DETAILED DESCRIPTION OF PREFERRED EMBODIMENTS

Figure 3:
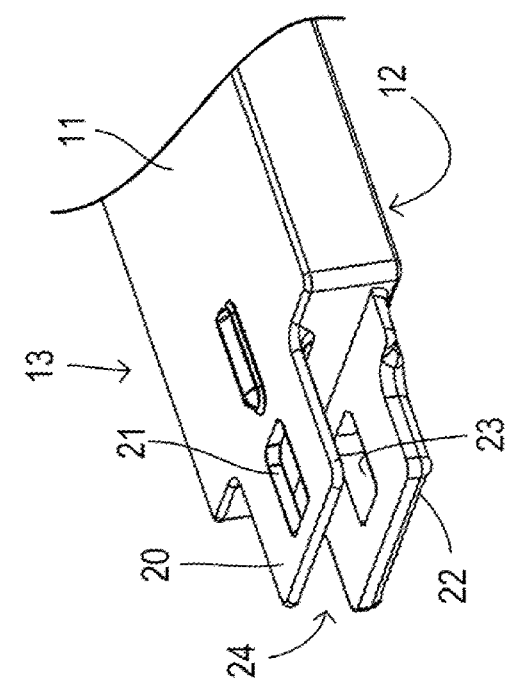
FIG. 3 is a perspective view of a first end of a rail segment.

Referring to FIGS. 1 and 2, a rail segment 10 has a top surface 11, a bottom surface 12, a first end 13, and a second end 14. Ends 13 and 14 form interlocks comprised of complementary clasp features which are configured such that rail segments can be sequentially joined together as a modular rail capable of traversing various distances by adding an appropriate number of rail segments (and using rail segments of different lengths, if available). Rail segment 10 includes a plurality of eyelets or passages 15 extending between top surface 11 and bottom surface 12. Preferably, eyelets 15 are arranged in pairs wherein each pair of eyelets 15 is located side-by-side between top surface 11 and bottom surface 12, and wherein each pair of eyelets 15 spaced longitudinally from an adjacent pair of eyelets 15. Each pair of eyelets 15 is adapted to receive a respective tie-down strap 16 (e.g., zip tie) which is threaded through the pair of eyelets and used to encircle and capture a respective portion of the wire harness branch.

Figure 4:
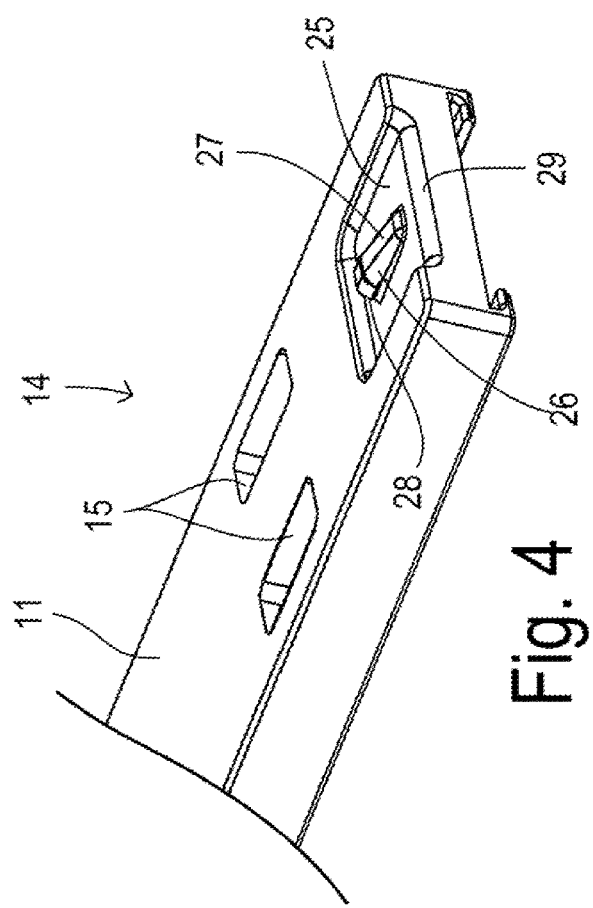
FIG. 4 is a perspective view of a second end of a rail segment.
Figure 5:
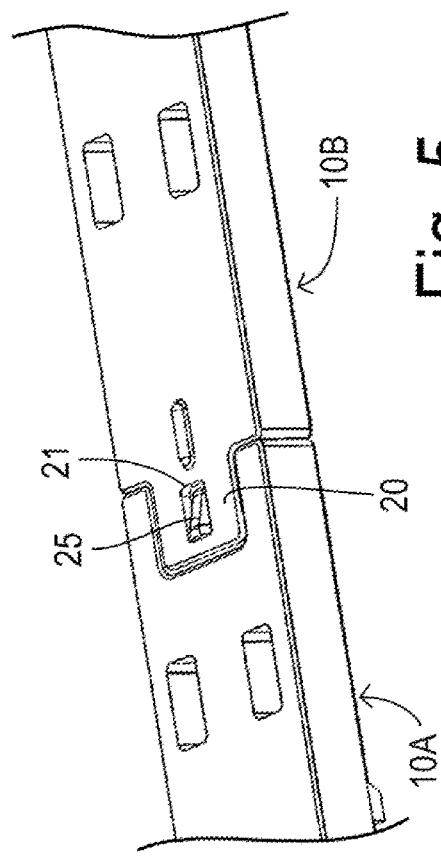
FIG. 5 is a perspective view of first and second ends of adjacent rail segments coupled together.

First end 13 and second end 14 are shown in greater detail in FIGS. 3 and 4, respectively. The clasp features on first end 13 include a latch tab 20 and a catch recess 21 formed as a hole through a flat panel which forms latch tab 20 as a longitudinal extension from rail segment top surface 11. A parallel tab 22 extending from bottom surface 12 may include a second catch recess 23. Tabs 20 and 22 extend in parallel planes so that there is a gap 24 between them which is configured to receive complementary clasp features on second end 14. In this embodiment, second end 14 has a tray area 25 configured to be inserted into gap 24. Tray area 25 includes a protrusion 26 with an inclined distal edge 27 which is adapted to deflect latch tab 20 when adjacent rail segments are joined. A front distal end of tray area 25 may preferably include a sloped edge 29 to further assist in deflecting latch tab 20. Protrusion 26 has a back end 28 extending perpendicular to the surface of tray area 25 which enters catch recess 21 after full insertion into gap 24 so that the complementary clasp features become interlocked. A similar protrusion and tray area are preferably formed on the bottom surface 12 in order to interact with parallel tab 22 and catch recess 23 in the same manner. FIG. 5 shows sequentially joined and interlocked rail segments 10A and 10B with protrusion 25 being fully captured in catch recess 21.

For attaching a modular rail made up of a plurality of interlocked rail segments, bottom surface 12 of rail segment 10 has a plurality of longitudinally spaced brackets 31, 32, and 33 as shown in FIG. 6. Since each bracket has the same structure, bracket 31 will be described in detail as representative of all the brackets. Bracket 31 includes a curved rib 35 and a curved rib 36 projecting from bottom surface 12 which are arranged to form a longitudinally extending slide track 37 between the ribs and bottom surface 12. Bracket 31 further includes a bump 38 coaxial with a center line between ribs 35 and 36 and spaced longitudinally adjacent the ends of curved ribs 35 and 36 beyond the end of slide track 37. Bump 38 acts as a retention feature for a mounting clip (e.g., a clip 40 shown in FIG. 7) to be mounted in slide track 37.

Figure 11:
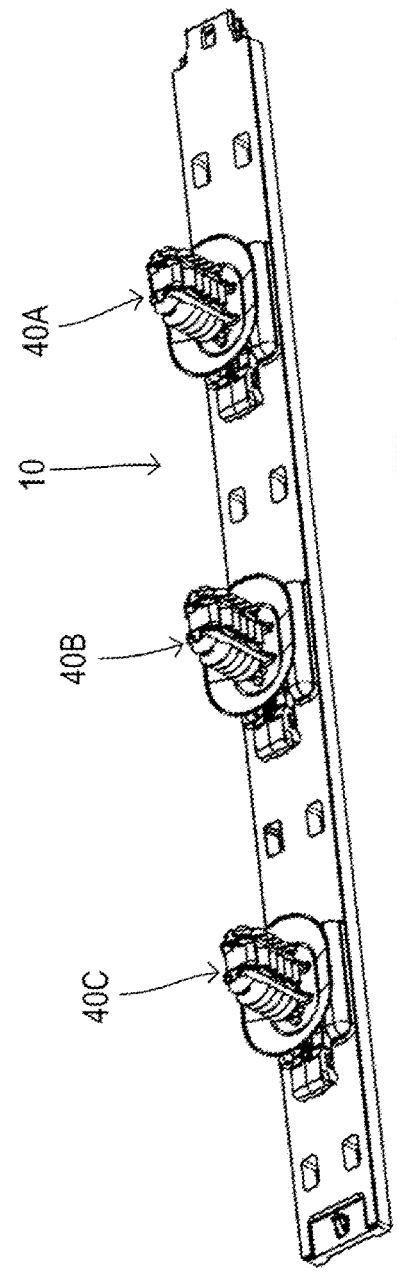
FIG. 11 shows clips attached to brackets on the bottom surface of a rail segment.

When the harness mounting system is attached to a vehicle, a plurality of clips are preferably utilized with each rail segment. In the embodiment illustrated in FIG. 7, clip 40 has a clip head 41 configured to assemble into slide track 37 and has a clip post 42 configured to engage the mounting hole in the vehicle surface. Clip post 42 preferably has a fir tree configuration as known in the art for engaging the mounting hole. As shown in FIG. 11, clips 40A, 40B, and 40C can be inserted into each respective bracket 31, 32, and/or 33 in order to mount a modular rail to the mounting holes in a structural panel of a vehicle, but it is not essential that every bracket contain a clip.

Figure 9:
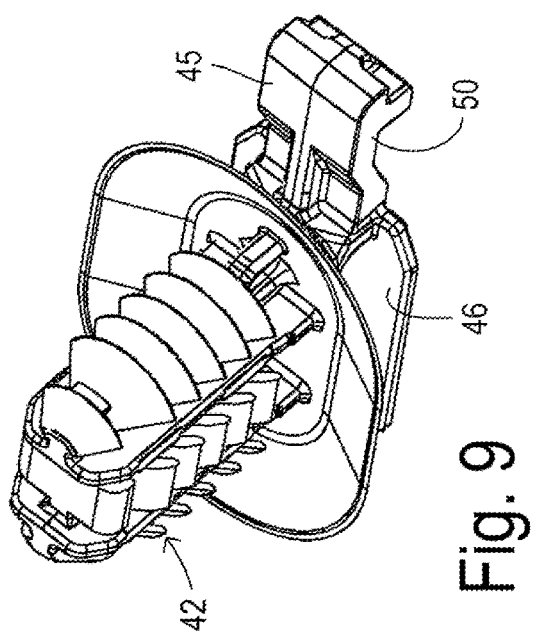

As shown in FIGS. 8 and 9, clip head 41 includes a flange 44 and a spring arm 45. Flange 44 provides a pair of wings 46 and 47 which are adapted to slide into slide track 37 formed by curved ribs 35 and 36. Spring arm 45 includes an abutment 48 at a remote end of spring arm 45 configured to bear against bottom surface 12 in order to generate friction which can be used to maintain a desired position of clip head 41 in slide track 37. The friction generated is configured to maintain a desired position while still allowing for deliberate manual sliding when needed to obtain a distance between adjacent clips that matches a distance between mounting holes in the vehicle structural panel. For additional retention, spring arm 45 further includes a recess 50 adapted to receive bump 38 once clip 40 is engaged in bracket 31.

Figure 10:
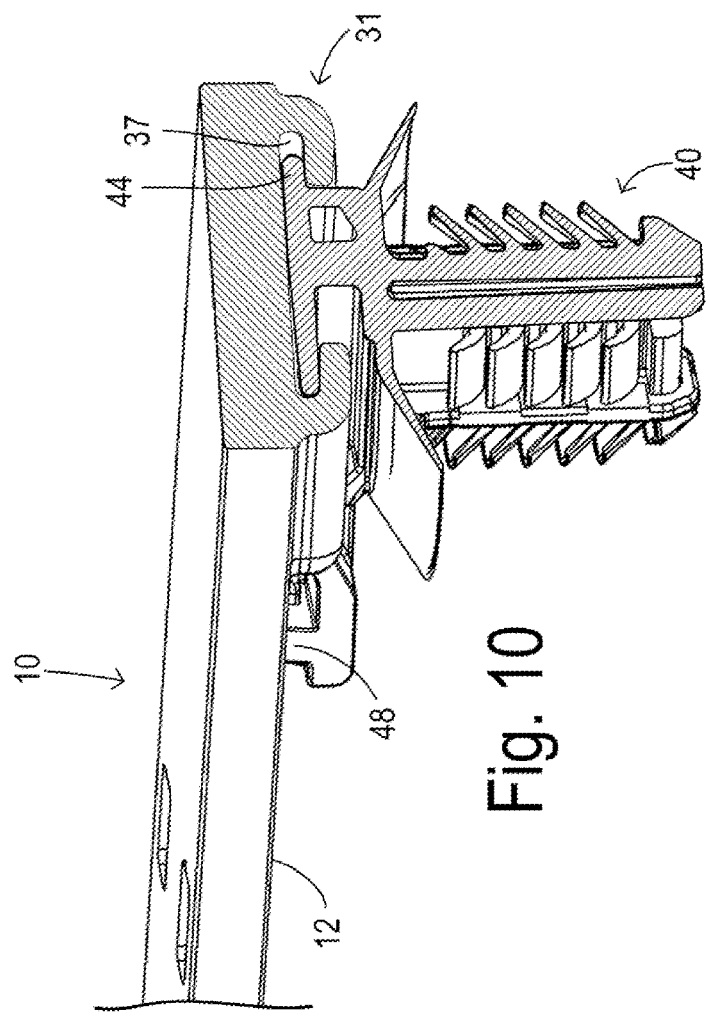
FIG. 10 is a cross-sectional view of the clip.

FIG. 10 depicts clip 40 engaged in bracket 31 with flange 44 received in slide track 37 and with abutment 48 engaging bottom surface 12 of rail segment 10. Recess 50 has a longitudinal length longer than bump 38 such that clip 40 may be positioned along a range of locations in slide track 37 in order to compensate for any tolerances between the actual and intended relationship of the clip and mounting hole positions.

Figure 12:
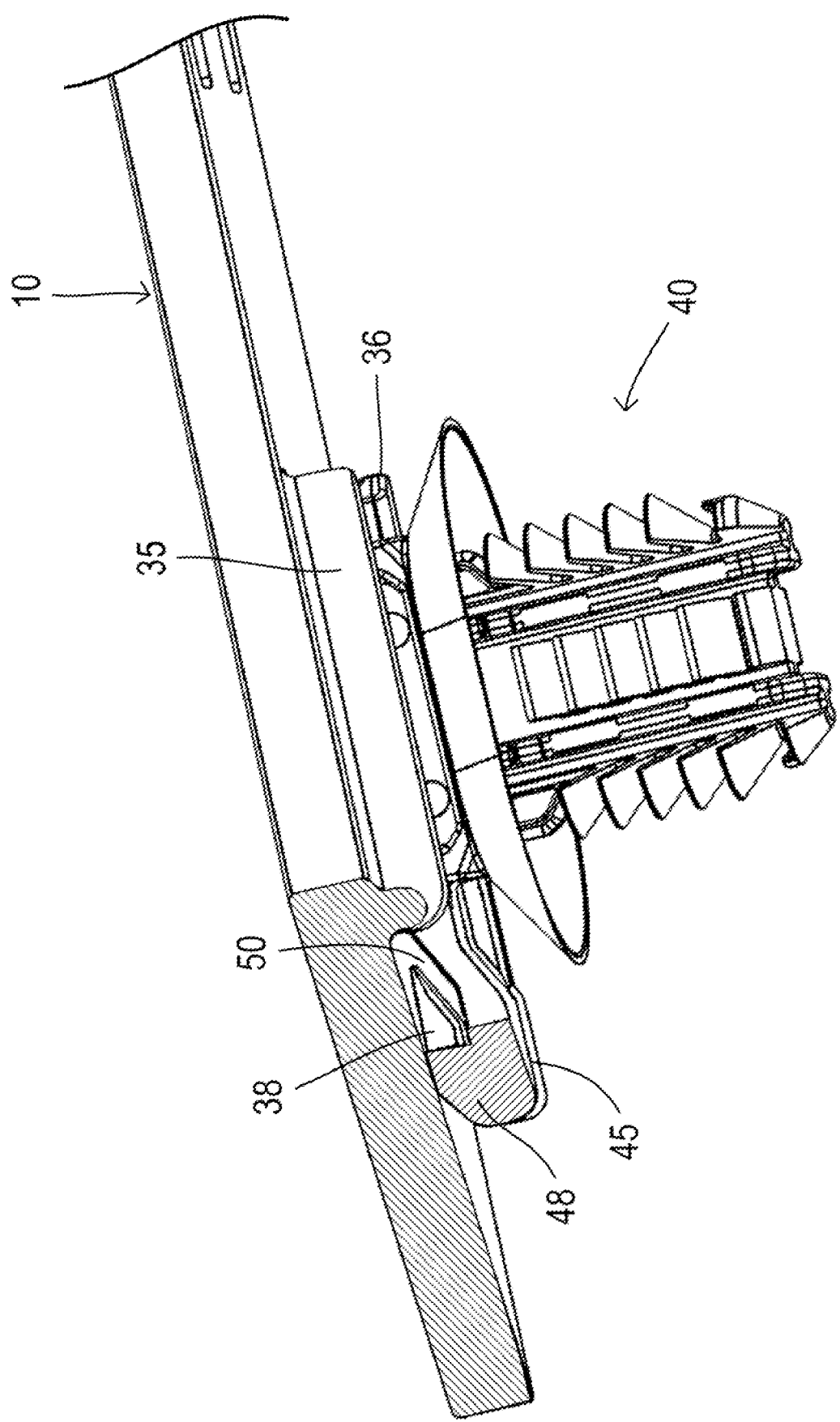
FIG. 12 is a cross-sectional view of a rail segment and clip.

FIG. 12 shows a cross section cut along a slanted plane which reveals bump 38 captured in recess 50. Bump 38 and abutment 48 may have slanted surfaces to facilitate a deflection of spring arm 45 when installing clip 40. After installation, flat adjoining surfaces between bump 38 and abutment 48 prevent clip 40 from coming off from rail segment 10 unless spring arm 45 is manually lifted away from bottom surface 12.

FIG. 13 shows the wire harness mounting system deployed in a vehicle in an exploded view. A rail segment 60 is one of several similar or identical rail segments (not shown) which are snapped together at their interlocking ends. A plurality of tie-down straps 62 are each threaded through respective pairs of eyelets 61 and each encircles a respective portion of a wire harness 63. Straps 62 may be comprised of zip ties with a tip passing down one eyelet and up an adjacent eyelet and then being secured in a locking head after being wrapped around the wire harness branch to be retained. After tightening of straps 62, the top surface of each rail segment receives wire harness 63.

Clips 65 are installed in brackets on the bottom surface of rail segment 60. Even after being captured in the brackets, clips 65 can be moved over a range of locations when the mounting system is assembled onto the vehicle by inserting clips 65 into holes 66 in a sheet metal panel 67.

What is claimed is:

1. A wire harness mounting system for mounting a wire harness within a road vehicle, comprising:
    a plurality of clips, each clip having a clip head and a clip post, wherein the clip post is configured to engage a mounting hole in a surface of the vehicle; and
    a modular rail comprised of a plurality of rail segments which are sequentially joined together by respective toolless interlocks disposed at each longitudinal end of each rail segment, wherein each rail segment has a plurality of eyelets at longitudinally-spaced locations for receiving respective tie-down straps adapted to encircle the wire harness, and wherein the interlocks are comprised of complementary clasp features including a latch tab that deflects to enable engagement of each respective interlock;
    wherein a bottom surface of each rail segment has a plurality of longitudinally-spaced brackets, wherein each bracket comprises a slide track configured to secure a clip head along a range of locations on the slide track; and
    wherein a top surface of each rail segment is adapted to receive the wire harness when the wire harness is secured via the tie-down straps being inserted through respective eyelets.

2. The wire harness mounting system of claim 1:
    wherein each rail segment is comprised of a longitudinal strap with a first end and a second end, the first and second ends having the complementary clasp features;
    wherein the latch tab extends longitudinally at the first end, wherein the complementary clasp features of the first end further include a parallel tab extending longitudinally at the first end with a gap between the latch tab and the parallel tab, and wherein the latch tab includes a catch recess; and wherein the second end is configured to insert into the gap, and wherein the complementary clasp features of the second end include a protrusion configured for capturing in the catch recess.

3. The wire harness mounting system of claim 2 wherein the protrusion has an inclined distal edge for deflecting the latch tab when joined to an adjacent rail segment.

4. The wire harness mounting system of claim 1 wherein the clip head of each clip comprises:
a flange configured to slide in the slide tracks of the brackets; and
a spring arm extending longitudinally along the rail segments and having an abutment at remote end bearing against the bottom surfaces of the rail segments.

5. The wire harness mounting system of claim 4 wherein the brackets on the bottom surface of the rail segments are comprised of a plurality of curved ribs forming the slide tracks and a plurality of bumps, wherein each bump is disposed adjacent a respective slide track, and wherein a respective spring arm of a clip installed in the respective bracket captures the corresponding bump.

6. The wire harness mounting system of claim 1 further comprising a plurality of tie-down straps passing through respective eyelets to encircle the wire harness.

7. The wire harness mounting system of claim 6 wherein the eyelets are arranged in pairs, wherein the eyelets in each pair are located side-by-side between the top surface and the bottom surface of a respective rail segment, and wherein each tie-down strap passes through a first eyelet of a respective pair of eyelets from the top surface to the bottom surface and passes through a second eyelet of the respective pair of eyelets from the bottom surface to the top surface.

8. A road vehicle comprising:
a structural sheet metal panel;
a wire harness;
a plurality of clips, each clip having a clip head and a clip post, wherein the clip post is configured to engage a mounting hole in the sheet metal panel; and
a modular rail comprised of a plurality of rail segments which are sequentially joined together by respective toolless interlocks disposed at each longitudinal end of each rail segment, wherein each rail segment has a plurality of eyelets at longitudinally-spaced locations for receiving respective tie-down straps adapted to encircle the wire harness, and wherein the interlocks are comprised of complementary clasp features including a latch tab that deflects to enable engagement of each respective interlock;
wherein a bottom surface of each rail segment has a plurality of longitudinally-spaced brackets, wherein each bracket comprises a slide track configured to secure a clip head along a range of locations on the slide track; and
wherein a top surface of each rail segment is adapted to receive the wire harness when the wire harness is secured via the tie-down straps being inserted through respective eyelets.

9. The road vehicle of claim 8:
wherein each rail segment is comprised of a longitudinal strap with a first end and a second end, the first and second ends having the complementary clasp features;
wherein the latch tab extends longitudinally at the first end, wherein the complementary clasp features of the first end further include a parallel tab extending longitudinally at the first end with a gap between the latch tab and the parallel tab, and wherein the latch tab includes a catch recess; and
wherein the second end is configured to insert into the gap, and wherein the complementary clasp features of the second end include a protrusion configured for capturing in the catch recess.

10. The road vehicle of claim 9 wherein the protrusion has an inclined distal edge for deflecting the latch tab when joined to an adjacent rail segment.

11. The road vehicle of claim 8 wherein the clip head of each clip comprises:
a flange configured to slide in the slide tracks of the brackets; and
a spring arm extending longitudinally along the rail segments and having a remote end bearing against the bottom surfaces of the rail segments.

12. The road vehicle of claim 11 wherein the brackets on the bottom surface of the rail segments are comprised of a plurality of curved ribs forming the slide tracks and a plurality of bumps, wherein each bump is disposed adjacent a respective slide track, and wherein a respective spring arm of a clip installed in the respective bracket captures the corresponding bump.

13. The road vehicle of claim 8 further comprising a plurality of tie-down straps passing through respective eyelets to encircle the wire harness.

14. The road vehicle of claim 13 wherein the eyelets are arranged in pairs, wherein the eyelets in each pair are located side-by-side between the top surface and the bottom surface of a respective rail segment, and wherein each tie-down strap passes through a first eyelet of a respective pair of eyelets from the top surface to the bottom surface and passes through a second eyelet of the respective pair of eyelets from the bottom surface to the top surface.

* * * * *